Figure 5:
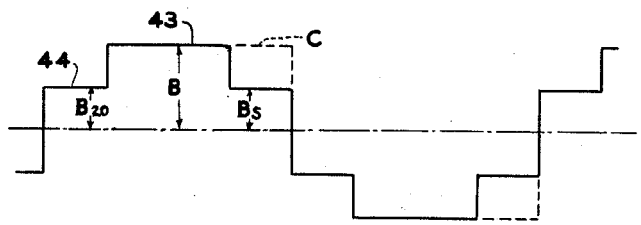

Nov. 24, 1964    W. J. MORRILL    3,158,769
ECCENTRIC WINDING ALTERNATING CURRENT DYNAMOELECTRIC MACHINE
Original Filed March 7, 1958    2 Sheets-Sheet 1
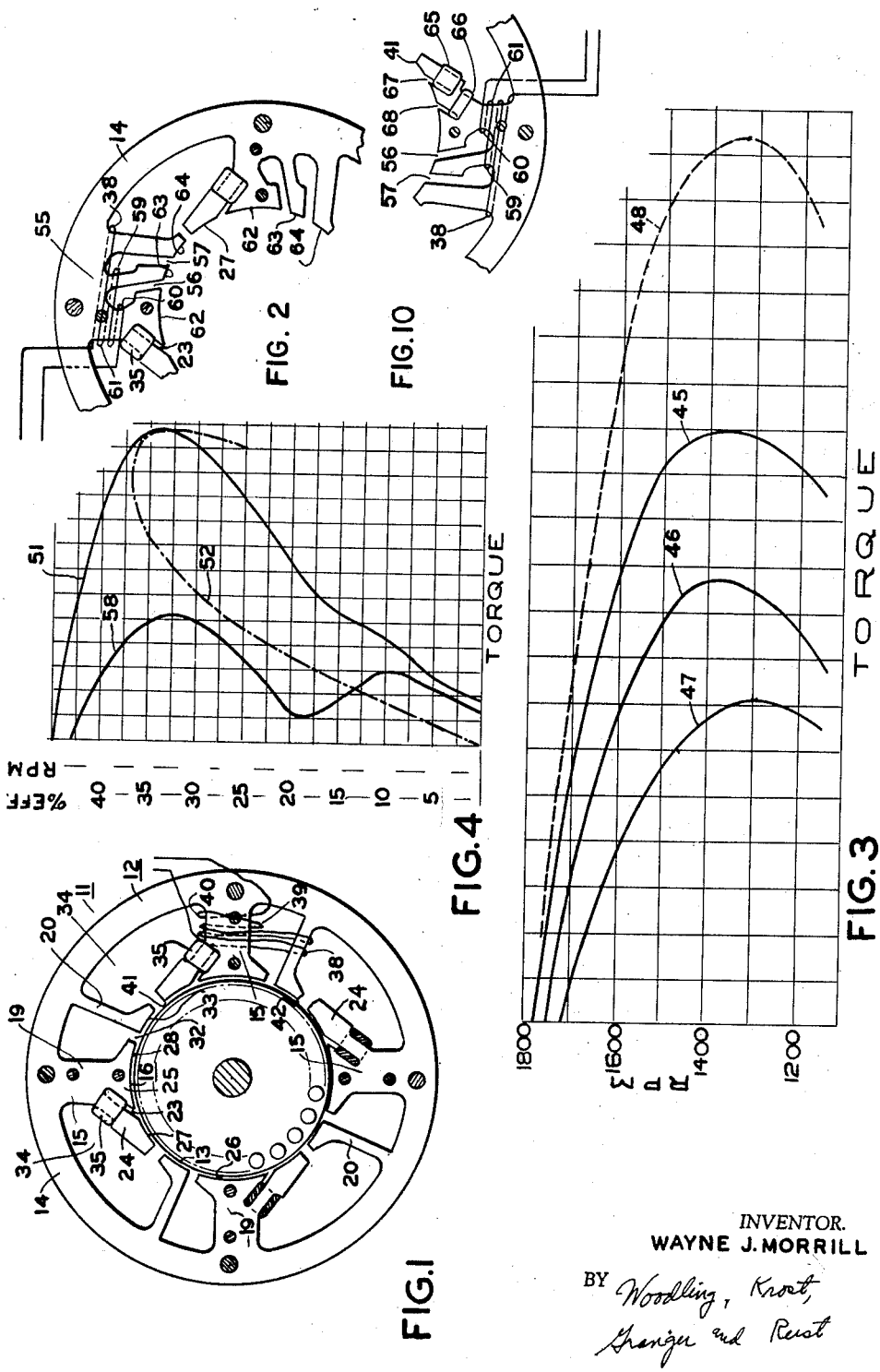
INVENTOR.
WAYNE J. MORRILL
BY Woodling, Krost,
Granger and Reist
ATTORNEYS Nov. 24, 1964　　W. J. MORRILL　　3,158,769
ECCENTRIC WINDING ALTERNATING CURRENT DYNAMOELECTRIC MACHINE
Original Filed March 7, 1958　　2 Sheets-Sheet 2

INVENTOR.
WAYNE J. MORRILL

United States Patent Office 3,158,769
Patented Nov. 24, 1964

3,158,769
ECCENTRIC WINDING ALTERNATING CURRENT
DYNAMOELECTRIC MACHINE
Wayne J. Morrill, % Electric Motors & Specialties Inc.,
Garrett, Ind.
Continuation of application Ser. No. 719,627, Mar. 7,
1958. This application Jan. 8, 1962, Ser. No. 164,758
17 Claims. (Cl. 310—172)

The invention relates in general to alternating current machines and more particularly to single phase shaded pole fractional horsepower motors.

Shaded pole motors of the induction, reluctance and hysteresis types are used on small sizes where efficiency of operation is not a prime consideration and where their cheapness of construction is a prime requisite. The simplicity and economies in construction of shaded pole motors would be utilized in larger sizes if the efficiency could be increased.

Accordingly, an object of the present invention is to increase the efficiency of shaded pole motors.

Another object of the invention is to provide a single phase induction motor with a more nearly sinusoidal stator flux distribution.

Another object of the invention is to provide a shaded pole induction motor with a lower magnetizing current and, hence, a lower wattage input to the motor for the same wattage output.

Another object of the invention is to provide a shaded pole induction motor which has reduced odd harmonics in the flux distribution wave with a consequent reduction of the tendency of the motor to run at a reduced speed and, therefore, a lower resistance squirrel-cage rotor may be used. With this lower resistance rotor, lower losses are incurred for a greater efficiency.

Still another object of the invention is to provide separate windings of different pitches and other than concentric on a shaded pole induction motor.

Still another object of the invention is to provide a different effective magnetomotive force in the leading edge of the pole face than on the central or main portion of the pole face.

The vast majority of shaded pole alternating current motors have been of the salient pole type. The use of the salient pole construction causes the introduction in the stator flux wave of large odd harmonics of space distribution, mainly, the third, fifth and seventh harmonics. These harmonics act on the rotor to cause torques corresponding to those in motors having three, five and seven times the fundamental number of poles. These harmonic torques, together with the load torque, can cause the rotor to stick at some low speed in which case the motor never comes up to full operating speed; this tendency is commonly referred to as a "harmonic dip." The bad effects of harmonic dips have been minimized in the past by the use of a relatively high resistance rotor at the sacrifice of motor output and efficiency. What this invention really accomplishes is the substantial elimination from the stator flux wave of these large odd harmonics and thus elimination of the detrimental torque dips. This in turn permits the use of a much lower resistance rotor than has been heretofore possible with consequent improvement in motor output and efficiency. Reduction of the odd harmonic stator fluxes further improves the motor electrically by reducing harmful airgap reactances and saturation effects in the magnetic paths produced by the harmonic fluxes.

Other objects and a fuller understanding of this invention may be had by referring to the following description and claims, taken in conjunction with the accompanying drawings, in which:

FIGURE 1 is a plan of a single phase induction motor stator embodying the invention;
FIGURE 2 shows a modified form of the invention;
FIGURE 3 is a graph of performance curves;
FIGURE 4 is another graph of performance curves of the invention;
FIGURES 5–9 show flux distribution patterns useful in explaining the invention; and
FIGURE 10 shows a further modification of the invention.

FIGURE 1 shows a plan view of a shaded pole induction motor 11 with the invention applied thereto as an example, but not limitation. The motor 11 has been shown as a four-pole motor but it may be of any number of poles. The motor 11 has a stator 12 and a rotor shown at 13. The rotor for simplicity may be a squirrel cage rotor and has been found to be efficiently operable with copper conductors for a low resistance rotor.

The stator 12 has a magnetically permeable yoke 14 connecting magnetically one end of a plurality of pole pieces 15. The other end of these pole pieces, which have been shown as being identical, terminates in a pole face 16. With reference to only one of the pole pieces 15, the pole piece has first and second portions 19 and 20. A first slot 23 extends into the first portion 19 and divides this first portion into first and second sections 24 and 25. This slot 23 extends away from the air gap 26 between the stator 12 and the rotor 13. The first section 24 has a first pole face portion 27 and the second section 25 has a second pole face portion 28. A second slot 32 is defined by the space between the first and second portions 19 and 20 and extends from the air gap 26 to the yoke 14. The second portion 20 has a third pole face portion 33. A common slot 34 or winding space lies between each of the pole pieces 15.

A conventional short circuited shading coil 35 is disposed in the first slot 23 and encircles the first section 24 to act on the first pole face portion 27, which may be considered as a shaded pole face. The first section 24 may thus be considered a shaded section.

The primary winding on the stator 12 is provided on each of the pole pieces 15 but in order to simplify the drawing a winding is shown on only one of the pole pieces 15. The primary winding includes a first coil or winding 38 encircling the entire pole piece 15, that is, both portions 19 and 20, and it thus acts on and energizes the entire pole piece 15. This winding 38 has been shown for diagrammatic reasons as being of only a few turns, but it will be understood that in accordance with usual practice, many turns are used. A second coil or winding 39 encircles only portion 19 which is approximately three-fourths of the pole piece 15 and accomplishes this by having a common coil side 40 in the common slot 34 with the first coil 38, and also passes through the second slot 32 which thus provides a winding space. The windings 38 and 39 may be connected in series, as shown, for energization from an external source. The shading coil 35 also has a coil side in the common slot 34 coincident with the common coil side 40 of the first and second coils 38 and 39. The trailing edge 41 of the pole face 16 is at the edge of the shaded pole face portion 27 of section 24 where portion 27 meets common slot 34. The leading edge 42 of the pole face 16 is at the edge of the pole face portion 33 of portion 20 where portion 33 meets common slot 34 of the next adjacent pole piece configuration.

The shading coil 35, together with the first and second coils 38 and 39, may be considered to be third winding means which provides a lagging flux component in the first pole section 24 and consequently in the first pole face portion 27. This is in accordance with the usual shaded pole induction motor operating principles. Since the short circuited shading coil 35 is in essence a short circuited secondary winding of a transformer, windings 38 and 39 being the primary winding, the currents which are generated by the secondary flux are in such a direction to oppose the primary flux and thus reduce its magnitude. Thus, in addition to producing a lagging flux, the shading coil 35 also acts to demagnetize or reduce the in-phase flux. This reduces the flux of the previously rectangular corner C shown in dotted lines of the primary flux distribution wave 43 shown in FIGURE 5 to the value shown in solid lines, thus making the in-phase primary and shaded flux distribution wave have an approximately symmetrical shape as shown in solid lines, with beneficial results which will be hereinafter described. The corner 44 of the wave 43 is reduced because of the lesser energization on the pole portion 20. The FIGURE 5 shows the wave 43 formed by the unshaded flux density B at the mid-portion, by the reduced magnitude flux density $B_{20}$ at the leading portion of the pole face, and by the shade flux density $B_s$ at the shaded pole face portion 27.

Figure 6:
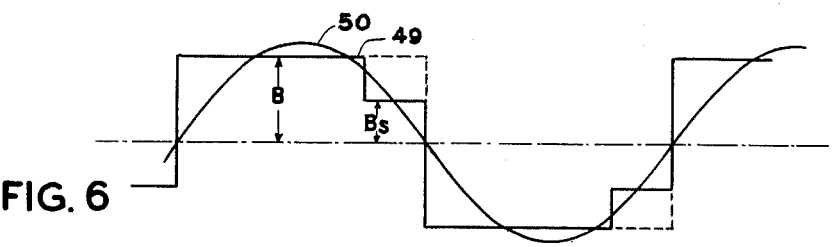

In prior conventional shaded pole motors with uniform air gaps, the flux wave produced peripherally in the air gap by the action of the full pitch primary winding alone and without the shading coil would have the full rectangular wave form 49 shown dotted and solid in FIGURE 6, assuming slot openings to be of negligible width. The action of the shading coil in addition to producing a quadrature, in time, or lagging flux component in the shaded region also served to reduce the amplitude of the shaded region in-phase, in time, flux to produce an in-phase stator flux distribution as shown in solid lines in FIGURE 6. The distribution wave of FIGURE 6 is plotted to show in solid lines the unshaded flux density B and that portion of the shaded flux density $B_s$ which is in time phase with B. It can be thought of as being the flux distribution in the stator at the time B is maximum. The quadrature or lagging (in time) flux component $B_q$ produced in the shaded region is as shown in FIGURE 7.

Figure 7:
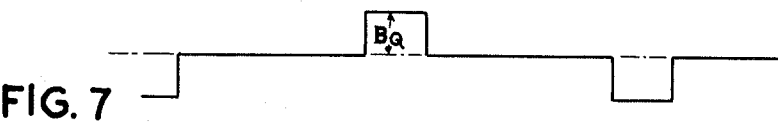

The quadrature flux of FIGURE 7 is responsible for the ability of the shaded pole motor to start and it serves to improve the output and efficiency during running by adding to the fundamental forward rotating field and subtracting from the fundamental backward rotating field.

A very important effect of the shading coil is that of demagnetizing the shaded corner of the in-phase flux wave 49 of FIGURE 6 to produce a much better in-phase wave form than would exist without the shading coil. This improvement in the in-phase wave form was the principal reason for the surprisingly excellent performance, compared to what might have been casually expected, of the conventional shaded pole motor. A motor of full pitch primary coil construction which would not even continue to run when driven to full speed would not only start, but run quite well once the shading coil was added.

The surprise of early shaded pole motor engineers at the relatively good performance of their simple structures probably resulted from their failure to evaluate the benefits of the demagnetizing action of the shading coil. The reasons for the benefit are disclosed by modern theory in accordance with which the only portion of the flux wave of FIGURE 6 which can develop useful torque with the rotor at full speed is the fundamental sinusoidal component.

Any rectangular wave form, such as the rectangular flux wave as represented by the solid rectangular curve 49 of FIGURE 6 (including the dotted portion) consists of a fundamental sinusoidal component, represented here by the sine wave 50, and an infinite number of progressively higher order sinusoidal odd harmonics. If the odd harmonics were completely absent, the flux wave 49 would conform exactly to the shape of its fundamental sine wave 50. The deviations therefore between the rectangular wave 49 and the sine wave 50 are caused by the odd harmonics. It is these odd harmonics of stator flux which cause the aforementioned torque dips. The more nearly the rectangular flux wave 49 can be modified to make it approximate the sine wave 50, the less will be the magnitude of the odd harmonics and their detrimental effects. It will be seen in FIGURE 6 that the demagnetizing action of the shading coil produces a flux wave form which is stepped on one side and which thus conforms more closely to the sine wave 50.

In my Patent 2,773,999, issued December 11, 1956, I showed that the best way to lop off the rectangular corner opposite the shaded portion was to chamfer the pole tip to make that portion of the stator flux wave conform very closely to the sine curve and almost completely eliminate the corner. The resulting wave 53 is shown in FIGURE 8.

Figure 8:
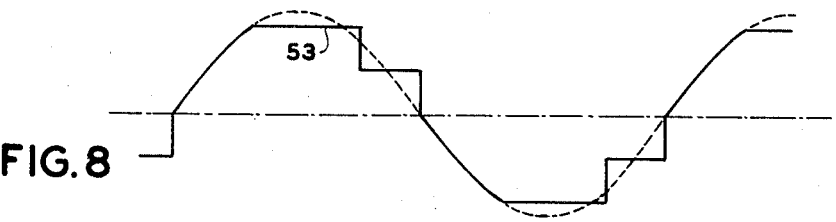
Figure 9:
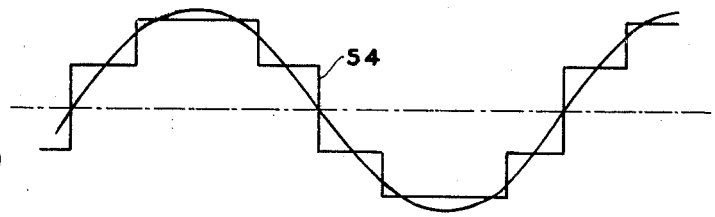

While the chamfered pole tip produced an improved stator flux distribution like the solid stepped curve 53 shown in FIGURE 8 and greatly reduced the motor torque dips and increased output and efficiency, it had the disadvantage that the chamfered pole tip produced a large air gap at that pole tip which caused larger than necessary rotor currents to flow at the instant the forward flux reached this large gap, and to a lesser extent substantially all the time. In addition, the large gap amounted, in effect, to throwing away some of the stator excitation for which ampere turns had been spent.

In accordance with the present invention the unshaded pole tip flux is made to conform more closely to the fundamental sine wave by reducing its excitation while maintaining a uniform air gap. The flux distribution wave 54 of FIGURE 9 results from the new construction, as shown in FIGURE 1, and it can be seen that the new construction produces a flux distribution wave closely approximating a sine wave without introducing a large air gap.

It should be especially noticed that the new winding 38–39 is not a conventional "concentric" winding, but it is a displaced or "eccentric" winding wtih one side of the shading coil 35 and one side of each primary coil in the same slot to maintain full excitation on the shaded section and thus full effectiveness of the shading coil. The demagnetizing action of the shading coil is used to bring the resultant in-phase flux wave into approximate symmetry and into approximae conformity with a sine wave.

As a result of the new construction saturation of the unshaded pole face 33 is reduced, torque dips are almost eliminated, harmonic braking torques at full speed are greatly reduced and rotor magnetizing currents are reduced. Further and surprisingly, the motor excitation can be effectively increased for the same degree of saturation and as a result, the output and efficiency can be further increased as compared with even the chamfered pole tip construction of my aforesaid Patent 2,773,999; due to the elimination of the objectionable harmonic fluxes, the total flux in the iron paths of the motor is reduced with the same excitation, or for the same degree of saturation a higher excitation may be employed.

The fact that the flux distribution is more nearly sinusoidal eliminates much of the odd harmonics such as the third and fifth harmonics and this greatly reduces the tendency of the rotor to stick at a reduced speed. In some prior art devices, if the dips in the speed-torque curve occurring at about one-third synchronous speed and caused by the third harmonics are severe enough, as shown in the curve 58 of FIGURE 4, the motor could, on certain load conditions, accelerate to about one-third synchronous speed but then not have sufficient torque to accelerate to its normal running speed. By the present invention, these dips in the speed-torque curve are greatly reduced, as shown in curve 51 of FIGURE 4, because of the more nearly sinusoidal flux distribution, and therefore, a lower resistance rotor may be used than is normally used with these small shaded pole induction motors. A substantial reduction in resistance is obtainable, such as by changing from aluminum to copper conductors of the same or larger size. The lower resistance rotor permits even greater efficiency by reducing the I²R losses of the rotor for a given wattage output.

The FIGURE 3 shows a speed-torque curve 45 of a motor incorporating the present invention. This curve 45 may be compared with curves 46 and 47. Curve 47 is that of an ordinary prior art single phase shaded pole induction motor of the same general stator dimensions; namely, the same amount of iron and the same ampere turn input but, of course, with the standard prior art form of pole piece. The curve 46 is a curve of the same basic motor but with the leading edge of the pole face chamfered or tapered as shown in my Patent 2,773,999. This resulted in an improvement in torque and efficiency over the standard shaded pole motor as shown in curve 47. The curve 45 of the present invention is of a motor with the same excitation as the motor for curves 46 and 47 and shows the superiority of the present invention over not only the prior art standard form, but also my previous invention with the tapered pole tip as shown by curve 46. Curve 48 is a speed-torque curve of the present invention with the primary windings over-excited by a one hundred forty volt supply as compared to the standard of one hundred fifteen volts on the motor, resulting in curve 45. In the past it has not been found possible to over-excite the standard motor of curve 47 or the tapered air gap motor of curve 46 without causing a considerable saturation of the iron and seriously decreasing the efficiency. In the present case, there was very little saturation in the iron and the torque increased considerably as shown by curve 48. The same performance of curve 48 may be obtained at normal one hundred fifteen volt excitation by increasing the wire size and decreasing the primary turns in a manner well known to all motor engineers.

FIGURE 4 is a graph of the motor of the present invention and shows a curve 51 of speed versus torque and also shows a curve 52 of efficiency versus torque with the efficiency rising to a maximum at a very desirable region; namely, near the maximum torque operating condition.

The air gap at each of the pole face portions 27, 28 and 33 is preferably equal, that is, the radial length of the gap across which the flux must travel between the rotor and stator is equal. The arcuate extent of the pole face portions is variable. However, preferably the extent of the first pole face portion 27 is about one-fourth of the pole face or pole pitch, or forty-five electrical degrees, and the second pole face portion, which is the main or central section, is about one-half the entire pole face or about ninety electrical degrees. The third pole face portion 33 thus accounts for the remainder and, while this is normally about one-fourth of the pole face portion, it may still beneficially vary widely from this value.

FIGURE 2 is a modified form of the invention as applied to a pole piece 55. In this case, the pole piece retains the first slot 23 and shading coil 35 but additionally second and third slots 56 and 57 are provided. These slots extend from the air gap toward the yoke 14. The first coil 38 encircles the entire pole piece 55, a second coil 59 passes through the third slot 57, and a third coil 60 passes through the second slot 56. All three coils 38, 59 and 60 have a common coil side at 61 and all coils on one pole piece 55 are connected in series.

The pole piece 55 of the modified form of the invention, while more complicated and more costly, is an electrical improvement over the pole piece 15 of FIGURE 1 because the flux distribution wave has two steps therein rather than only one step and, hence, the flux distribution wave is more nearly sinusoidal.

In the modification of FIGURE 2, the entire pole face again has a first portion 27 and has a main portion 62. This main portion may be in the order of forty percent of the entire pole face arc. The third and fourth pole face portions 63 and 64, as determined by the slots 56 and 57, are preferably about the same arcuate extent and total between twenty-five and forty percent of the entire arc of the pole face.

FIGURE 10 shows a further modification of the construction of FIGURE 2, wherein two shading coils 65 and 66 are used, both having a coil side in the same common slot or winding space as the coil sides 61. This construction maintains consistency of complication of the primary winding and the shading coil winding. The shading coil 65 is in a slot 67 and the shading coil 66 is in a slot 68. The slots 67 and 68 are preferably about one-sixth and one-third, respectively, of the pole pitch from the trailing edge 41 at the common coil side 61. The resistances of the two shading coils may be adjusted to bring the resultant in-phase stepped wave as closely as possible into conformity with a sine wave. Obviously, the use of more than one shading coil, while increasing the complication of the motor and its cost, would, if properly done, improve the in-phase flux distribution curve over what could be obtained with one shading coil. The improvement in the in-phase wave form would, in many cases, result in improved motor performance, provided the additional stator slot openings do not introduce sufficient counter-balancing reluctance effects.

This application is a continuation of my application Serial Number 719,827 filed March 7, 1958 and now abandoned, which is a continuation-in-part of my application Serial Number 700,138 now Patent Number 3,081,043 filed December 2, 1957.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A pole piece for an alternating current motor, comprising, first, second, and third pole face portions disposed in that order on said pole piece, first and second energizing winding means energizable from an external source acting on said pole piece and establishing a first magnetomotive force at said second pole face portion and a second magnetomotive force of lesser magnitude at said third pole face portion, and third winding means establishing a magnetomotive force at said first pole face portion displaced in phase from said first magnetomotive force.

2. In an alterating current motor, a magnetic pole piece having first, second and third pole face portions, said second pole face portion being intermediate said first and third pole face portions, first and second winding means acting on said pole piece for establishing a first magnetomotive force at said second pole face portion and a second magnetomotive force in phase with but of lesser magnitude than said first magnetomotive force at said third pole face portion, and third winding means cooperating with said first and second winding means for establishing at said first pole face portion a third magnetomotive force phase displaced with respect to said first magnetomotive force.

3. An alternating current motor including a rotor and a pole piece, first and second portions of said pole piece, first and second pole face portions on said first portion, said and second pole piece portions defining a slot extending into said pole piece, a third pole face portion on said second pole piece portion, each said pole face portion defining substantially equal air gaps with said rotor, first and second winding means on said pole piece at least partially in said slot and encompassing different extents of said pole piece to establish a greater flux density at said second pole face portion than at said third pole face portion, and means establishing a phase displaced component of flux in said first pole face portion.

4. A pole piece for a shaded pole motor, comprising, first and second portions of said pole piece, shading coil means on a section of said first portion of said pole piece remote from said second portion and defining a shaded section of said pole piece, a shaded pole face portion on said shaded section and a main pole face portion on the remainder of said first pole piece portion, a third pole face portion on said second pole piece portion, and first and second energizing winding means energizable from an external source at least partially energizing said pole piece and establishing greater effective magnetomotive force at said main pole face portion than at said third pole face portion.

5. A shaded pole motor, comprising, a rotor, a pole piece having first and second portions, shading coil means on a section of said first portion of said pole piece to define a shaded section of said pole piece, a shaded pole face portion on said shaded section and a main pole face portion on the remainder of said first pole piece portion, a third pole face portion on said second pole piece portion, said main pole face portion being intermediate said shaded and third pole face portions, each of said pole face portions defining substantially equal length air gaps with said rotor, first and second winding means energizing said pole piece and establishing a first flux in the air gap at said main pole face portion and a second flux in the air gap at said third pole face portion and having a lower flux density than said first flux.

6. A shaded pole motor comprising a rotor, a pole piece defining an air gap with said rotor and having first and second portions, a first slot extending into said first portion and defining first and second pole sections in said first portion of said pole piece, a short circuited shading coil in said slot and encircling said first section of said first portion of said pole piece, first and second pole face portions on said first and second pole sections, said first and second pole piece portions defining a second slot extending into said pole piece, a third pole face portion on said second pole piece portion, each said pole face portion defining substantially equal length air gaps with said rotor, first and second winding means at least partially energizing said pole piece and establishing a first flux in the air gap at said second pole face portion and a second flux in the air gap at said third pole face portion of lower flux density than said first flux.

7. A single phase dynamoelectric machine including a pole piece having a central portion and two side portions, first winding means energizing the entire pole piece, second winding means cooperating with said first winding means and encircling at least said central portion to establish a magnetomotive force therein of greater magnitude than at one side portion, and means establishing in one of said side portions a magnetomotive force which is phase displaced relative to the magnetomotive force in said central portion.

8. A single phase dynamoelectric machine including a pole piece having a central portion and two side portions, first, second and third winding means, said first winding means energizing the entire pole piece and having a coil side on one side of said pole piece, said second winding means energizable from an external source and encircling said central portion and one side portion and having one coil side on the same side of said pole piece as said coil side of said first winding means, said third winding means including a short circuited coil acting on one side portion of said pole piece and having a coil side on the same side of said pole piece as said coil sides of said first and second winding means.

9. A shaded pole single phase motor including a pole piece, first, second and third winding means on said pole piece, said first winding means having a coil side and encircling the entire pole piece, said second winding means energizable from an external source and encircling less than the entire pole piece and having one coil side in the same winding space as said coil side of said first winding means, and said third winding means including a short circuited coil having a coil side in said winding space and encircling a portion of said pole piece different from that encircled by said second winding means.

10. A single phase motor, comprising, a rotor, a stator including a slotted pole piece, first winding means encircling the entire pole piece and having a coil side in one of said slots, second energizing winding means energizable from an external source and encircling less than the entire pole piece and having one coil side in said one slot, and third winding means including a short circuited coil having a coil side in said one slot and encompassing a portion of said pole piece different from that encircled by either said first or second winding means.

11. A single phase shaded pole motor including a sloted pole piece, first, second, and third winding means on said pole piece, said first winding means energizing the entire pole piece, said first winding means having a coil side in one of said slots and establishing a first magnetomotive force in said pole piece, said second winding means encircling approximately three-fourths of said pole piece, said second winding means having one coil side in said one slot and together with said first winding means establishing a second magnetomotive force of greater magnitude than said first magnetomotive force in said pole piece, said third winding means including a short circuited coil encompassing approximately one-fourth of said pole piece and cooperating with said first and second winding means to establish magnetomotive force in said pole piece which lags said first magnetomotive force.

12. A single phase shaded pole motor, comprising, a stator having a plurality of slotted pole pieces, first, second and third winding means on each pole piece, each said first winding means including a first coil encircling the entire respective pole piece and having a coil side in one of said slots, each of said second winding means including a second energizing coil energizable from an external source and encircling approximately three-fourths of the respective pole piece and having one coil side in said one slot, each of said third winding means including a short circuited coil encompassing approximately one-fourth of the respective pole pieces and having a coil side in said one slot.

13. A shaded pole induction motor, comprising, a plurality of pairs of pole pieces, a yoke interconnecting one end of each pole piece, a squirrel cage rotor magnetically cooperating across an air gap with the other end of each pole piece, each pole piece comprising first and second portions, first and second pole sections in each said first portion of said pole piece defining a slot extending into each said first portion from said air gap, a short circuited shading coil in each said slot and encircling the respective first pole section, first and second pole face portions respectively on said first and second pole sections, each said first and second pole piece portions defining a second slot extending into said pole piece from said air gap, a third pole face portion on said second pole piece portion, each said pole face portion defining substantially identical length of air gaps with said rotor, a first winding entirely encircling each pole piece, a second winding connected in series with each first winding and encircling only said first portion of the respective pole piece through the respective second slot, said first, second and third pole face portions of each pole piece subtending in the order of forty-five, ninety, and forty-five electrical degrees, respectively, each of said first and second windings establishing a first flux in the respective second pole face portion and a second flux in the respective third pole face portion having a lower flux density than said first flux.

14. A one and one-half coil per pole shaded pole induction motor, comprising, two pairs of pole pieces, a magnetic yoke interconnecting one end of each pole piece, a squirrel cage rotor magnetically cooperating across an air gap with the other end of each pole piece for a total of four distinct flux paths through said pole pieces, yoke and rotor, each pole piece comprising first and second portions, first and second pole sections in said first portion of said pole piece defining a first slot extending partially into said first portion from said air gap, a short circuited shading coil in each said slot and encircling the respective first pole section to define a shaded section of the respective first pole portion, first and second pole face portions on each said first and second pole sections, each said first and second pole piece portions defining a second slot extending from said air gap substantially to said yoke, a third pole face portion on each said second pole piece portion, each said pole face portion defining substantially identical radial lengths of air gaps with said rotor, a first winding entirely encircling each pole piece, a second winding connected in series with each first winding and encircling only said first portion of the respective pole piece through the respective second slot and excluding said second pole piece portion, said first, second and third pole face portions of each pole piece subtending in the order of forty-five, ninety, and forty-five electrical degrees, respectively, each said first and second windings establishing a first flux in the respective second pole face portion and a second flux in the respective third pole face portion in phase with and having a lower flux density than said first flux, each said shading coil cooperating with the respective first and second windings to establish a third flux in the respective first pole face portion which lags said first flux.

15. A pole piece for a shaded pole single phase induction motor having a pole face on said pole piece and adapted to define an air gap with a rotor, said pole piece comprising, first and second edges on said pole face, said pole piece having a first slot extending therein from said pole face approximately one-fourth the pole pitch from said first edge, said pole piece having a second slot extending therein from said pole face approximately one-fourth the pole pitch from said second edge, first, second and third pole face portions on said pole face with said first portion being defined by the area between said first edge and said first slot, said second pole face portion being defined by the area between said first and second slots, and said third pole face portion being defined by the area between said second slot and said second edge, a shading coil lying in said first slot and defining an annular ring around that portion of said pole piece lying behind said first pole face portion, a first stator winding circumscribing said pole piece, and a second stator winding connected in series with said first winding and circumscribing the section of said pole piece behind said first and second pole face portions, said first and second windings establishing a first magnetomotive force in the portion of said pole piece lying behind said second pole face portion and a second magnetomotive force in the portion of the said pole piece lying behind said third pole face portion in phase with but having lesser magnitude than said first magnetomotive force, and said shading coil cooperating with said first and second windings to establish in said portion of said pole piece lying behind said first pole face portion a third magnetomotive force having a lesser magnitude than said first magnetomotive force thereby to provide a more nearly sinusoidal flux distribution across said pole face and in said air gap.

16. A shaded pole single phase induction motor, comprising, a squirrel cage rotor and a stator cooperable therewith, said stator comprising an annular permeable yoke and an even plurality of pole pieces, each said pole piece having a pole face defining an air gap with said rotor and having leading and trailing edges, each said pole piece having a first slot extending therein from said pole face approximately one-fourth the pole pitch thereof from said trailing edge, each said pole piece having a second slot extending therein from said pole face approximately one-fourth the pole pitch thereof from said leading edge, each said second slot extending into the respective pole piece to a point closely adjacent said yoke, first, second, and third portions on each said pole face with said first portion being defined by the area between said trailing edge and said first slot, said second pole face portion being defined by the area between said first and second slots, and said third pole face portion being defined by the area between said second slot and said leading edge, a short-circuited shading coil lying in each said first slot and defining an annular ring around that portion of the respective pole piece lying behind the respective first pole face portion, a first stator winding coil entirely circumscribing each pole piece, and a second stator winding coil connected in series with each first coil and passing through the respective second slot and acting on only the respective first and second pole face portions, said first and second coils of each pole piece establishing a first flux in the respective second pole face portion and the portion of said air gap defined thereby and a second flux in the respective third pole face portion and the portion of said air gap defined thereby in phase with but having a lower flux density than said first flux, and each said shading coil cooperating with the respective first and second coils to establish a third flux in the respective first pole face portion and the portion of said air gap defined thereby having a lower flux density than said first flux thereby to provide a more nearly sinusoidal flux distribution across said pole face and in said air gap defined thereby.

17. A pole piece for an alternating current motor, comprising, in combination, first, second, third and fourth pole face portions on said pole piece, first and second winding means acting on said pole piece and establishing a first magnetomotive force at said third pole face portion and a second magnetomotive force of lesser magnitude at said fourth pole face portion, and third and fourth winding means including first and second short circuited windings acting on said first and second pole face portions, respectively.

References Cited in the file of this patent

UNITED STATES PATENTS

| | | |
|---|---|---|
| 1,884,115 | Morrill | Oct. 25, 1932 |
| 2,251,674 | Gillen | Aug. 5, 1941 |
| 2,258,575 | MacKay | Oct. 7, 1941 |
| 2,606,083 | Kitto et al. | Aug. 5, 1952 |